United States Patent
Shaikh et al.

(10) Patent No.: US 8,497,343 B2
(45) Date of Patent: *Jul. 30, 2013

(54) POLYARYLATE COMPOSITIONS AND ARTICLES THEREFROM

(75) Inventors: Abbas Alli Ghudubhai Shaikh, Karnataka (IN); Govind Subbanna Wagle, Karnataka (IN); Ramesh Rajeswaran, Karnataka (IN); Ganesh Kannan, Evansville, IN (US); Kyle Patrick Starkey, Evansville, IN (US); Michael Stephen Donovan, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 828 days.

This patent is subject to a terminal disclaimer.

(21) Appl. No.: 11/100,268

(22) Filed: Apr. 6, 2005

(65) Prior Publication Data
US 2006/0229428 A1    Oct. 12, 2006

(51) Int. Cl.
*C08G 63/181* (2006.01)
*C08G 63/183* (2006.01)
*C08G 63/193* (2006.01)

(52) U.S. Cl.
USPC ......... 528/305; 528/307; 528/308; 528/308.6

(58) Field of Classification Search
USPC ............................... 528/307, 305, 308, 308.6
See application file for complete search history.

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |
| 3,028,365 A | 4/1962 | Schnell et al. |
| 3,148,172 A | 9/1964 | Fox |
| 3,153,008 A | 10/1964 | Fox |
| 3,271,367 A | 9/1966 | Schnell et al. |
| 3,271,368 A | 9/1966 | Goldberg et al. |
| 3,546,165 A | 12/1970 | Morgan |
| 4,217,438 A | 8/1980 | Brunelle et al. |
| 4,318,837 A | 3/1982 | Streets et al. |
| 4,387,209 A | 6/1983 | Rieder et al. |
| 4,401,803 A | 8/1983 | Rieder |
| 4,533,511 A | 8/1985 | Mark |
| 4,925,913 A | 5/1990 | Teramoto et al. |
| 4,967,306 A | 10/1990 | Hampl, Jr. et al. |
| 5,013,818 A * | 5/1991 | Takemura et al. ............ 528/193 |
| 5,051,490 A | 9/1991 | Joyce et al. |
| 5,134,220 A | 7/1992 | Serini et al. |
| 6,713,592 B2 | 3/2004 | Su |
| 7,277,230 B2 * | 10/2007 | Srinivasan et al. ............ 359/642 |
| 2004/0227879 A1 | 11/2004 | Elman et al. |

FOREIGN PATENT DOCUMENTS

| | | | |
|---|---|---|---|
| JP | 2001-122952 | * | 5/2001 |
| JP | 2001122952 | | 5/2001 |

OTHER PUBLICATIONS

Vibhute et al.; Synthesis and Characterization of New Cardo Polyesters; Journal of Polymer Sciences: Part A: Polymer Chemistry; vol. 35; 1997; pp. 3227-3234.*
Kroschwitz, Ed.; Concise Encyclopedia of Polymer Science and Engineering; John Wiley and Sons, Inc.; New York; 1990; pp. 813 and 814.*
Sax et al.; Hawley's Condensed Chemical Dictionary, Eleventh Edition; Van Nostrand Reinhold; New York; 1987; p. 933.*
Shune-Long Wu et al.; Synthesis of Aromatic Polyesters and Copolyesters from the Diol of Spirobiindane; Datong Xuebao, 19, pp. 111-115; Nov. 1989; CODEN:TTHPCI; ISSN:0379-7309.*
S. V. Vinogradova et al.; Heterochain Polyesters, Communication 62, "Polyarylates" from Biphenyldicarboxylic Acids; Institute of Heteroorganic Compounds, Academy of Sciences of the USSR, Translated from Izvestiya Akademii Nauk SSSR, Seriya Khimicheskaya, No. 2, 308-314; Feb. 1966; pp. 275-279.*
Dubrovina, L. V. et al.; Branched polyarylates; Vysokomolekulyarnye Soedineniya (1966), 8(4); pp. 752-758; CODEN VMSDA8; ISSN: 0042-9368.*
Dubrovina, L. V. et al.; Comparison of some experimental methods for determination of molecular weight distribution in polymers; Vysokomolekulyarnye Soedineniya (1966), 8(11); pp. 1965-1969; CODEN VMSDA8; ISSN: 0042-9368.*
Polymer Preprints—D. B. Priddy, Jr. and J. E. McGrath, Novel Phosphorous-containing Poly(arylene ether)s Based on Phenolphthalein and its Aminated Derivatives, pp. 231-232.
J. Polym. Sci. Polym. Chem—S. S. Vibhute, et al., Synthesis and Characterization of New Cardo Polyesters, 35, 3227 (1997).
Journal of Applied Polymer Science—J. Lo, et al., Photo-Fries Rearrangement of Fluorene-Based Polyarylates, vol. 29, p. 35 to 43 (1984).

* cited by examiner

*Primary Examiner* — Rabon Sergent
(74) *Attorney, Agent, or Firm* — Cantor Colburn LLP

(57) ABSTRACT

A polyarylate composition comprising: structural units derived at least one substituted or unsubstituted diacid, at least one aromatic dihydroxy compound, and an unsaturated compound. The composition possesses good optical properties, flow, stability and mechanical property. Also disclosed is a process to prepare these compositions and articles therefrom.

3 Claims, No Drawings

POLYARYLATE COMPOSITIONS AND ARTICLES THEREFROM

BACKGROUND OF THE INVENTION

This invention relates to thermoplastic resin compositions, more particularly to polyarylate compositions, a method to synthesize the composition and articles made from this and related compositions.

Optical films are well known in the art. Glass has been widely used for several optical applications, due to its excellent characteristics, such as transparency, a high transmittance in the visible light range and temperature resistance. Nevertheless, the use of glass as a sub layer or support in optical applications has limitations in its application, especially in the area of flexible optical devices, due to its high weight and brittleness. In addition, the brittleness of glass, limits its use in continuous processing leading to a very low final productivity.

It is desirable to replace glass in numerous applications with transparent polymeric films, such as polyesters (e.g., polyethyleneterephthalate), polyacrylates (e.g., polymethylmethacrylate) or polycarbonate. Although these polymers have good properties, they possess poor transmittance, limited heat resistance and a low glass transition temperature (Tg), that would limit employment of these polymers in optical applications.

U.S. Pat. Nos. 3,546,165; 4,387,209; 4,401,803 describe fluorene based polyesters with isophthalic or terephthalic acids which are thermally stable but have unsatisfactory mechanical properties and low inherent viscosity. While U.S. Pat. No. 4,533,511 discloses a process for spinning fibers obtained from the polycondensation product of 9,9-bis-(4-hydroxyphenyl)-fluorene and a mixture of isophthalic acid chloride and terephthalic acid chloride.

The U.S. Pat. No. 4,967,306 discloses a fluorene diol with isophthalic and terephthalic acid polyester containing a very low level of oligomeric material but having a tensile strength, elongation, chemical resistance, temperature stability, ultraviolet resistance and vacuum stability higher than the copolymers containing oligomeric species. However, the films containing small amounts of oligomer "yellow" or degrade upon limited exposure to ultraviolet radiation.

Polyarylates composed of fluorene diol and isophthalic acid as reported in Journal of Applied Polymer Science, Vol. 29, p. 35 to 43 (1984) was found to possess insufficient abrasion resistance and film coating quality was poor. Polyarylates derived from phenolphthalein and its derivatives exhibit combination of properties of high softening temperature, good solubility, high thermal resistance and considerable mechanical strength at higher temperatures. (B. D. Priddy, Jr.; J. E. McGrath, Polym Preprints 33(2), 231 (1992); S. S. Vibhuthe et al J. Polym. Sci. Polym. Chem. 35, 3227 (1997). The various classes of polymers such as polyesters derived from bis(hydroxyphenyl)fluorene, cyclic olefins and poly(aryl ether sulfone)s have been considered for display applications under various trade names by Promerus, Ferrania, and Sumitomo Bakelite Companies. These polymers show Tg from 223 to 330° C.

The polymer film should show excellent optical properties in addition to good thermal properties to allow high temperature processing, good mechanicals and also excellent barrier properties in order to find its use in optical applications. There is a continuing need for polymeric thermoplastic compositions to possess a good balance of transparency and processability, in addition to good mechanical and thermal properties.

BRIEF DESCRIPTION OF THE INVENTION

One embodiment of the present invention is a polyarylate composition comprising: structural units derived from at least one substituted or unsubstituted diacid and at least one aromatic dihydroxy compound of structure (I),

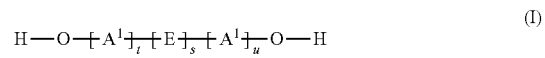

where A1 is independently at each occurrence a C3-C20 aromatic radical; E is independently at each occurrence a bond, a C1-C20 aliphatic radical, a C3-C20 cycloaliphatic radical, or a C5-C20 aromatic radical, a sulfur atom, a sulfinyl group, a sulfonyl group, a selenium atom, or an oxygen atom; and t, s and u are independently integers from 0-10 wherein at least one of t, s and u is not zero and an unsaturated compound of structure (VIII)

wherein $R^5$ and $R^6$ are independently at any occurrence a carboxylate, oxygen, carbonyl groups; $R^7$ and $R^8$ are independently at each occurrence hydrogen, aliphatic, aromatic or cycloaliphatic groups. The composition disclosed possesses good optical properties, coupled with enhanced thermal and mechanical properties. Also, disclosed is a process to make the polyarylate compositions of the present invention and articles derived from said composition.

Various other features, aspects, and advantages of the present invention will become more apparent with reference to the following description, examples and appended claims.

DETAILED DESCRIPTION OF THE INVENTION

The present invention may be understood more readily by reference to the following detailed description of preferred embodiments of the invention and the examples included herein. In this specification and in the claims, which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "aliphatic radical" refers to a radical having a valence of at least one comprising a linear or branched array of atoms which is not cyclic. The array may include heteroatoms such as nitrogen, sulfur, silicon, selenium and oxygen or may be composed exclusively of carbon and hydrogen. Aliphatic radicals may be "substituted" or "unsubstituted". A substituted aliphatic radical is defined as an aliphatic radical which comprises at least one substituent. A substituted aliphatic radical may comprise as many substituents as there are positions available on the aliphatic radical for substitution. Substituents which may be present on an aliphatic radical include but are not limited to halogen atoms such as fluorine, chlorine, bromine, and iodine. Substituted aliphatic radicals include trifluoromethyl, hexafluoroisopropylidene, chloromethyl; difluorovinylidene; trichloromethyl, bromoethyl, bromotrimethylene (e.g. —CH$_2$CHBrCH$_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e. —$CONH_2$), carbonyl, dicyanoisopropylidene (i.e. —$CH_2C(CN)_2CH_2$—), methyl (i.e. —$CH_3$), methylene (i.e. —$CH_2$—), ethyl, ethylene, formyl, hexyl, hexamethylene, hydroxymethyl (i.e. —$CH_2OH$), mercaptomethyl (i.e. —$CH_2SH$), methylthio (i.e. —$SCH_3$), methylthiomethyl (i.e. —$CH_2SCH_3$), methoxy, methoxycarbonyl, nitromethyl (i.e. —$CH_2NO_2$), thiocarbonyl, trimethylsilyl, t-butyldimethylsilyl, trimethyoxysilypropyl, vinyl, vinyledene and the like. Aliphatic radicals are defined to comprise at least one carbon atom. A $C_1$-$C_{10}$ aliphatic radical includes substituted aliphatic radicals and unsubstituted aliphatic radicals containing at least one but no more than 10 carbon atoms.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having $4n+2$ "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. Aromatic radicals may be "substituted" or "unsubstituted". A substituted aromatic radical is defined as an aromatic radical which comprises at least one substituent. A substituted aromatic radical may comprise as many substituents as there are positions available on the aromatic radical for substitution. Substituents which may be present on an aromatic radical include, but are not limited to halogen atoms such as fluorine, chlorine, bromine, and iodine. Substituted aromatic radicals include trifluoromethylphenyl, hexafluoroisopropylidenebis(4-phenyloxy) (i.e. —$OPhC(CF_3)_2PhO$—), chloromethylphenyl; 3-trifluorovinyl-2-thienyl; 3-trichloromethylphenyl (i.e. 3-$CCl_3Ph$-), bromopropylphenyl (i.e. $BrCH_2CH_2CH_2Ph$-), and the like. For convenience, the term "unsubstituted aromatic radical" is defined herein to encompass, as part of the "array of atoms having a valence of at least one comprising at least one aromatic group", a wide range of functional groups. Examples of unsubstituted aromatic radicals include 4-allyloxyphenoxy, aminophenyl (i.e. $H_2NPh$-), aminocarbonylphenyl (i.e. $NH_2COPh$-), 4-benzoylphenyl, dicyanoisopropylidenebis(4-phenyloxy) (i.e. —$OPhC(CN)_2PhO$—), 3-methylphenyl, methylenebis(4-phenyloxy) (i.e. —$OPhCH_2PhO$—), ethylphenyl, phenylethenyl, 3-formyl-2-thienyl, 2-hexyl-5-furanyl; hexamethylene-1,6-bis(4-phenyloxy) (i.e. —$OPh(CH_2)_6PhO$—); 4-hydroxymethylphenyl (i.e. 4-$HOCH_2Ph$-), 4-mercaptomethylphemyl (i.e. 4-$HSCH_2Ph$-), 4-methylthiophenyl (i.e. 4-$CH_3SPh$-), methoxyphenyl, methoxycarbonylphenyloxy (e.g. methyl salicyl), nitromethylphenyl (i.e. -$PhCH_2NO_2$), trimethylsilylphenyl, t-butyldimethylsilylphenyl, vinylphenyl, vinylidenebis(phenyl), and the like. The term "a $C_3$-$C_{10}$ aromatic radical" includes substituted aromatic radicals and unsubstituted aromatic radicals containing at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. Cycloaliphatic radicals may be "substituted" or "unsubstituted". A substituted cycloaliphatic radical is defined as a cycloaliphatic radical which comprises at least one substituent. A substituted cycloaliphatic radical may comprise as many substituents as there are positions available on the cycloaliphatic radical for substitution. Substituents which may be present on a cycloaliphatic radical include but are not limited to halogen atoms such as fluorine, chlorine, bromine, and iodine. Substituted cycloaliphatic radicals include trifluoromethylcyclohexyl, hexafluoroisopropylidenebis(4-cyclohexyloxy) (i.e. —$OC_6H_{11}C(CF_3)_2C_6H_{11}O$—), chloromethylcyclohexyl; 3-trifluorovinyl-2-cyclopropyl; 3-trichloromethylcyclohexyl (i.e. 3-$CCl_3C_6H_{11}$—), bromopropylcyclohexyl (i.e. $BrCH_2CH_2CH_2C_6H_{11}$—), and the like. For convenience, the term "unsubstituted cycloaliphatic radical" is defined herein to encompass a wide range of functional groups. Examples of unsubstituted cycloaliphatic radicals include 4-allyloxycyclohexyl, aminocyclohexyl (i.e. $H_2NC_6H_{11}$—), aminocarbonylcyclopentyl (i.e. $NH_2COC_5H_9$—), 4-acetyloxycyclohexyl, dicyanoisopropylidenebis(4-cyclohexyloxy) (i.e. —$OC_6H_{11}C(CN)_2C_6H_{11}O$—), 3-methylcyclohexyl, methylenebis(4-cyclohexyloxy) (i.e. —$OC_6H_{11}CH_2C_6H_{11}O$—), ethylcyclobutyl, cyclopropylethenyl, 3-formyl-2-terahydrofuranyl, 2-hexyl-5-tetrahydrofuranyl; hexamethylene-1,6-bis(4-cyclohexyloxy) (i.e. —$OC_6H_{11}(CH_2)_6C_6H_{11}O$—); 4-hydroxymethylcyclohexyl (i.e. 4-$HOCH_2C_6H_{11}$—), 4-mercaptomethylcyclohexyl (i.e. 4-$HSCH_2C_6H_{11}$—), 4-methylthiocyclohexyl (i.e. 4-$CH_3SC_6H_{11}$—), 4-methoxycyclohexyl, 2-methoxycarbonylcyclohexyloxy (2-$CH_3OCOC_6H_{11}O$—), nitromethylcyclohexyl (i.e. $NO_2CH_2C_6H_{10}$—), trimethylsilylcyclohexyl, t-butyldimethylsilylcyclopentyl, 4-trimethyoxysilyethylcyclohexyl (e.g. $(CH_3O)_3SiCH_2CH_2C_6H_{10}$—), vinylcyclohexenyl, vinylidenebis(cyclohexyl), and the like. The term "a $C_3$-$C_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

The present inventors have unexpectedly discovered a polyarylate composition comprising a substituted or unsubstituted diacid, an aromatic dihydroxy compound and an unsaturated compound having good optical properties coupled with the enhancement in the thermal properties.

A component of the composition of the invention is a substituted or unsubstituted diacid. In one embodiment of the present invention the diacid is meant to include carboxylic acids having two carboxyl groups each useful in the preparation of the polyester resins of the present invention are preferably aliphatic, aromatic or cycloaliphatic. Chemical equivalents of these diacids include esters, alkyl esters, e.g., dialkyl esters, diaryl esters, anhydrides, salts, acid chlorides, acid bromides, and the like are also included. Examples of diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or a chemical equivalent. Linear dicarboxylic acids like adipic acid, azelaic acid, dicarboxyl dodecanoic acid, and succinic acid may also be useful. Examples of aromatic dicarboxylic acids are acids that contain a single aromatic ring per molecule but are not limited to isophthalic or terephthalic acid, 1,2-di(p-carboxyphenyl)ethane, 4,4'-dicarboxydiphenyl ether, 4,4'-bisbenzoic acid and mixtures thereof, as well as acids containing fused rings such as, e.g., 1,4- or 1,5-naphthalene dicarboxylic acids. In a preferred embodiment, the dicarboxylic acid precursor of residue is terephthalic acid or alternatively a mixture of terephthalic and isophthalic acids. Non-limiting examples of the polyvalent carboxylic acid include, an aromatic polyvalent carboxylic acid, an aromatic oxycarboxylic acid, an aliphatic dicarboxylic acid, and an alicyclic dicarboxylic acid, including terephthalic acid, isophthalic acid, ortho-phthalic acid, 1,5-naphthalenedicarboxylic acid, 2,6-naphthalenedicarboxylic acid, diphenic acid, sulfoterephthalic acid, 5-sulfoisophthalic acid, 4-sulfophthalic acid, 4-sulfonaphthalene-2,7-dicarboxylic acid, 5-[4-sulfophenoxy] isophthalic acid, sulfoterephthalic acid, diphenoxyethanedicarboxylic acid or 3-sulfoisophthalic acid, p-oxybenzoic acid, p-(hydroxyethoxy)benzoic acid, succinic acid, oxalic acid, adipic acid, azelaic acid, sebacic acid, dodecanedicarboxylic acid, fumaric acid, maleic acid, itaconic acid, hexahydrophthalic acid, tetrahydrophthalic acid, trimethylphenyl indanoic acid, trimellitic acid, trimesic acid, and pyrromellitic acid, dimeric acid, and ester-forming derivatives thereof.

In one embodiment of the present invention the polyarylates comprise structural units derived from aromatic polyols. In another embodiment the polyols are aromatic dihydroxy compounds. In one embodiment at least one aromatic hydroxy compound is a dihydroxy aromatic compound of the formula -I-

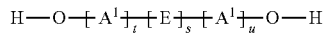
(-I-)

wherein $A_1$ is independently at each occurrence a $C_3$-$C_{20}$ aromatic radical; E is independently at each occurrence a bond, a $C_1$-$C_{20}$ aliphatic radical, a $C_3$-$C_{20}$ cycloaliphatic radical, or a $C_5$-$C_{20}$ aromatic radical, a sulfur atom, a sulfinyl group, a sulfonyl group, a selenium atom, or an oxygen atom; and t, s and u are independently integers from 0-10 wherein at least one of t, s and u is not zero.

Suitable aromatic radicals "$A^1$" include, but are not limited to, phenylene, biphenylene, naphthalene, and the like. Suitable groups "E" include but are not limited to alkylene and alkylidene groups, for example methylene, ethylene, ethylidene, propylene, propylidene, isopropylidene, butylene, butylidene, isobutylidene, amylene, amylidene, isoamylidene, and the like. The group "E" includes $C_5$-$C_{20}$ aromatic radicals for example the $C_{12}$ divalent aromatic radical represented by structure -II-, the dashed lines (Structure -II-) indicating the points of attachment of the radical to the $A^1$ groups shown in structure -II-.

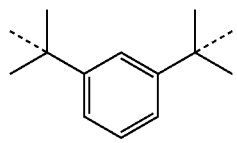
(-II-)

The group "E" may also be a tertiary nitrogen linkage; an ether linkage; a carbonyl linkage; a silicon-containing linkage, silane, siloxy; or a sulfur-containing linkage including, but not limited to sulfide, sulfoxide, sulfone, and the like; or a phosphorus-containing linkage including but not limited to phosphinyl, phosphonyl and the like. In other embodiments E may be a cycloaliphatic group including, but not limited to 1,1-cyclopentylidene; 1,1-cyclohexylidene; 3,3,5-trimethyl-1,1-cyclohexylidene; 3-methyl-1,1-cyclohexylidene; 2-[2.2.1]-bicycloheptylidene, neopentylidene, cyclopentadecylidene, cyclododecylidene, adamantylidene, and the like.

In one embodiment the dihydroxy aromatic compound represented by structure -I-, E may be an unsaturated alkylidene group. Suitable dihydroxy-substituted aromatic hydrocarbons of this type include those of the formula -III-:

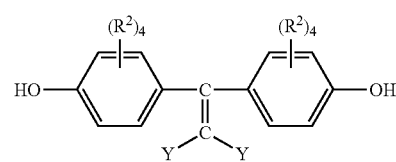
(-III-)

wherein independently each $R^2$ is independently at each occurrence hydrogen, chlorine, bromine, fluorine, or a $C_{1-20}$ monovalent aliphatic radical (for example a methyl group, a t-butyl group, or a methoxy group) and each Y is independently at each occurrence hydrogen, chlorine, bromine or fluorine.

Suitable dihydroxy-substituted aromatic hydrocarbons also include those of the formula -IV-:

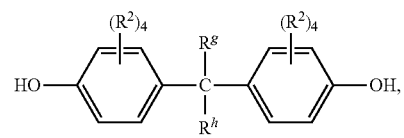
(-IV-)

wherein each $R^2$ is independently hydrogen, chlorine, bromine, fluorine, or a $C_{1-20}$ monovalent aliphatic radical (for example a methyl group, a t-butyl group, or a methoxy group), and $R^g$ and $R^h$ are independently hydrogen, a $C_1$-$C_{20}$ aliphatic radical, a $C_3$-$C_{20}$ cycloaliphatic radical or a $C_4$-$C_{20}$ aromatic radical. Further $R^g$ and $R^h$ may together form a $C_4$-$C_{20}$ cycloaliphatic radical.

In some embodiments of the present invention, dihydroxy-substituted aromatic hydrocarbons that may be used to comprise those disclosed by name or formula (generic or specific) in U.S. Pat. Nos. 2,991,273; 2,999,835; 3,028,365; 3,148,172; 3,153,008; 3,271,367; 3,271,368 and 4,217,438. In other embodiments of the invention, dihydroxy-substituted aromatic hydrocarbons comprise bis(4-hydroxyphenyl)sulfide; bis(4-hydroxyphenyl)ether; bis(4-hydroxyphenyl)sulfone; bis(4-hydroxyphenyl)sulfoxide; 1,4-dihydroxybenzene; 4,4'-oxydiphenol; 2,2-bis(4-hydroxyphenyl)hexafluoropropane; 4,4'-(3,3,5-trimethylcyclohexylidene)diphenol; 4,4'-bis(3,5-dimethyl)diphenol; 1,1-bis(4-hydroxy-3-methylphenyl)cyclohexane; 4,4-bis(4-hydroxyphenyl)heptane; 2,4'-dihydroxydiplienylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3- ethylphenyl)propane; 2,2-bis(4-hydroxy-3-isopropylphenyl) propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,5-dihydroxy naphthalene; 2,6-dihydroxy naphthalene; hydroquinone; resorcinol; $C_{1-3}$ alkyl-substituted resorcinols; 4-methyl resorcinol; catechol; 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl)-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis(3,5-dimethylphenyl-4-hydroxyphenyl) ethane; 2,2-bis(3,5-dimethylphenyl-4-hydroxyphenyl) propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl)sulfoxide; bis(3,5-dimethyl-4-hydroxyphenyl)sulfone; bis(3,5-dimethylphenyl-4-hydroxyphenyl)sulfide; and like bisphenols. In a particular embodiment the dihydroxy-substituted aromatic hydrocarbon is bisphenol A.

In some embodiments the dihydroxy-substituted aromatic compounds represented by structure -I- includes compounds comprising one or more fused rings represented by component "E", attached to one or more aromatic groups $A^1$. Suitable dihydroxy-substituted aromatic hydrocarbons of this type include those containing indane structural units such as represented by the formula (-V-), 3-(4-hydroxyphenyl)-1,1,3-trimethylindan-5-ol; and by the formula (-VI-), 1-(4-hydroxyphenyl)-1,3,3-trimethylindan-5-ol.

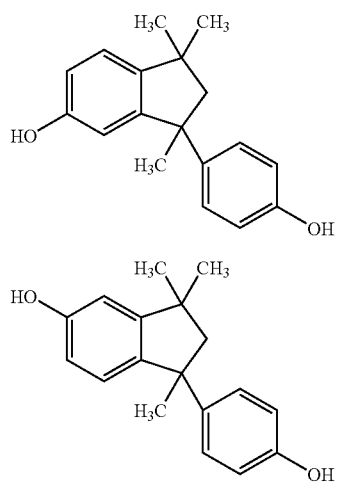

Also included with the class of dihydroxy aromatic compounds represented by formula -I- are bisphenols comprising spirocyclic structures as component "E", for example as in 2,2,2',2'-tetrahydro-1,1'-spirobi[1H-indene]diol. The term "alkyl" as used in the various embodiments of the present invention falls within the definition of an "aliphatic radical" as defined herein.

In one embodiment of the present invention the aromatic diols include its chemical equivalents. Chemical equivalents to the diols include esters, such as dialkylesters, diaryl esters, and the like.

In one embodiment of the present invention the aromatic dihydroxy compound is of structure -VII-

wherein $R^3$ is a substituted or unsubstituted aryl group and $R^4$ is selected from the group consisting of substituted or unsubstituted (secondary) alkyl, substituted or unsubstituted cycloaliphatic, substituted or unsubstituted heterocyclic group, or $R^3$ and $R^4$ can be linked together to form at least five member substituted or unsubstituted ring. In another embodiment of the present invention the five member ring may also comprise of a heteroatom, examples of heteroatom include but are not limited to oxygen, nitrogen, sulfur and the like.

In one embodiment of the present invention the polyarylate composition comprises structural units derived from an unsaturated compound of structure (VIII).

wherein $R^5$ and $R^6$ are independently at any occurrence a carboxylate, oxygen or carbonyl groups; $R^7$ and $R^8$ are independently at each occurrence hydrogen, aliphatic, aromatic or cycloaliphatic groups. In one embodiment of the present invention the unsaturated compound could be an unsaturated dicarboxylic acid, unsaturated esters, unsaturated modified esters or unsaturated ethers. The unsaturated compound can be aliphatic, cycloaliphatic or aromatic, such as fumaric, maleic, itaconic, citraconic, mesaconic, aconitic, traconic, hexenedioic, octenedioic or 5-norbornene-2,3-dicarboxylic, or 4,4'-stilbenedicarboxylic acid. The unsaturated compound may also be an unsaturated diol such as 2-butene-1,4-diol. In one embodiment the unsaturated compound is fumaryl chloride. In one embodiment the unsaturated compound may be present in the polymer backbone or as a pendant group thereby enabling cross-linking and grafting and enhancing the properties.

The ratio of reactants in the composition of the present invention is important. In one embodiment the diacid is present in a range from about 1 to about 99 mole percent. In one embodiment, the composition comprises the dihydroxy aromatic compound in the range of between about 99 mole percent and about 1 mole percent. Typically, the unsaturated compound is present in a range of between about 0 weight percent and about 30 weight percent based on the total weight of the polyarylate composition. In another embodiment the unsaturated compound is present in a range of between about 1 weight percent and about 30 weight percent based on the total weight of the polyarylate composition. In yet another embodiment the unsaturated compound is preferably present in a range corresponding to between about 5 to about 10 weight percent based on the amount of polyarylate composition. In another embodiment the dihydroxy compound and the diacid are present in stiochiometric ratio. In one embodiment the polyarylate composition may be random or block structures.

The composition of the present invention may include additional components which do not interfere with the previously mentioned desirable properties but enhance other favorable properties such as anti-oxidants, flame retardants, reinforcing materials, colorants, mold release agents, fillers, nucleating agents, UV light and heat stabilizers, lubricants and the like. Additionally, additives such as antioxidants, minerals such as talc, clay, mica, barite, wollastonite and other stabilizers including but not limited to UV stabilizers, such as benzotriazole, supplemental reinforcing fillers such as flaked or milled glass and the like, flame retardants, pigments or combinations thereof may be added to the compositions of the present invention.

Flame-retardant additives are desirably present in an amount at least sufficient to reduce the flammability of the polyester resin, preferably to a UL94 V-0 rating. The amount will vary with the nature of the resin and with the efficiency of the additive. In general, however, the amount of additive will be from 1 to 30 percent by weight based on the weight of resin. A preferred range will be from about 5 to 20 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate) or mixtures thereof. Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals or with brominated phenoxy radicals or brominated epoxy resins.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially preferred is antimony trioxide ($Sb_2O_3$). Synergists such as antimony oxides, are typically used at about 0.1 to 10 by weight based on the weight percent of resin in the final composition. Also, the final composition may contain polytetrafluoroethylene (PTFE) type resins or copolymers used to reduce dripping in flame retardant thermoplastics.

Also halogen-free flame retardants can be used. Typical flame-retardants are P-based flame retardants as organic phosphates (e.g. $P(=O)(OR1)(OR2)(OR3)$ etc), phosphonates (e.g. $R-P(=O)(OR1)(OR2)$ etc), phosphinates (e.g. $R1,R2-P(=O)(OR3)$ etc, phosphine oxides (e.g. $R1,R2,R3-P(=O)$ etc) as well as the corresponding phosphate, phosphonate and/or phosphinate salts of these P-compounds. Besides P-based flame retardants also N-containing compounds can be used like triazine derivatives as melamine cyanurate, melamine (pyro or poly)phosphates, etc. Also other compounds as Zn-borates, hydroxides or carbonates as Mg- and/or Al-hydroxides or carbonates, Si-based compounds like silanes or siloxanes, Sulfur based compounds as aryl sulphonates (including salts) or sulphoxides, Sn-compounds as stannates can be used as well often in combination with one or more of the other possible flame retardants.

Other additional ingredients may include antioxidants and UV absorbers and other stabilizers. Antioxidants include i) alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(alpha-methylcyclohexyl)-4,6 dimethylphenol, 2,6-di-octadecyl-4-methylphenol, 2,4,6-tricyclohexyphenol, 2,6-di-tert-butyl-4-methoxymethylphenol; ii) alkylated hydroquinones, for example, 2,6-di-tert-butyl-4-methoxyphenol, 2,5-di-tert-butyl-hydroquinone, 2,5-di-tert-amyl-hydroquinone, 2,6-diphenyl-4-octadecyloxyphenol; iii) hydroxylated thiodiphenyl ethers; iv) alkylidene-bisphenols; v) benzyl compounds, for example, 1,3,5-tris-(3,5-di-tert-butyl-4-hydroxybenzyl)-2,4,6-trimethylbenzene; vi) acylaminophenols, for example, 4-hydroxy-lauric acid anilide; vii) esters of beta-(3,5-di-tert-butyl-4-hydroxyphenol)-propionic acid with monohydric or polyhydric alcohols; viii) esters of beta-(5-tert-butyl-4-hydroxy-3-methylphenyl)-propionic acid with monohydric or polyhydric alcohols; vii) esters of beta-(5-tert-butyl-4-hydroxy-3-methylphenyl) propionic acid with mono- or polyhydric alcohols, e.g., with methanol, diethylene glycol, octadecanol, triethylene glycol, 1,6-hexanediol, pentaerythritol, neopentyl glycol, tris(hydroxyethyl) isocyanurate, thiodiethylene glycol, N,N-bis(hydroxyethyl) oxalic acid diamide. Typical, UV absorbers and light stabilizers include i) 2-(2'-hydroxyphenyl)-benzotriazoles, for example, the 5'-methyl-, 3'5'-di-tert-butyl-,5'-tert-butyl-, 5'(1,1,3,3-tetramethylbutyl)-,5-chloro-3',5'-di-tert-butyl-,5-chloro-3'tert-butyl-5'methyl-,3'sec-butyl-5'tert-butyl-,4'-octoxy,3',5'-ditert-amyl-3',5'-bis-(alpha,alpha-dimethylbenzyl)-derivatives; ii) 2.2 2-Hydroxy-benzophenones, for example, the 4-hydroxy-4-methoxy-,4-octoxy,4-decloxy-, 4-dodecyloxy-,4-benzyloxy,4,2',4'-trihydroxy- and 2'hydroxy-4,4'-dimethoxy derivative, and iii) esters of substituted and unsubstituted benzoic acids for example, phenyl salicylate, 4-tert-butylphenyl-salicylate, octylphenyl salicylate, dibenzoylresorcinol, bis-(4-tert-butylbenzoyl)-resorcinol, benzoylresorcinol, 2,4-di-tert-butyl-phenyl-3,5-di-tert-butyl-4-hydroxybenzoate and hexadecyl-3,5-di-tert-butyl-4-hydroxybenzoate. Phosphites and phosphonites stabilizers, for example, include triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, tristearyl sorbitol triphosphite, and tetrakis(2,4-di-tert-butylphenyl)4,4'-biphenylene diphosphonite.

Dyes or pigments may be used to give a background coloration. Dyes are typically organic materials that are soluble in the resin matrix while pigments may be organic complexes or even inorganic compounds or complexes, which are typically insoluble in the resin matrix. These organic dyes and pigments include the following classes and examples: furnace carbon black, titanium oxide, phthalocyanine blues or greens, anthraquinone dyes, scarlet 3b Lake, azo compounds and acid azo pigments, quinacridones, chromophthalocyanine pyrroles, halogenated phthalocyanines, quinolines, heterocyclic dyes, perinone dyes, anthracenedione dyes, thioxanthene dyes, parazolone dyes, polymethine pigments and others.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well. When the mixture of isomers or more than one diacid or diol is used, a copolyester or a mixture of two polyesters may be used as the present cycloaliphatic polyester resin.

Optionally a catalyst may be present for the synthesis of the polyarylates of the present invention. In one embodiment the catalysts include, but are not limited to metal salts and chelates of Ti, Zn, Ge, Ga, Sn, Ca, Li and Sb. Other known catalysts may also be used for this step-growth polymerization. The choice of catalyst being determined by the nature of reactants. The various catalysts for use herein are very well known in the art and are too numerous to mention individually herein. A few examples of the catalysts which may be employed in the above process include but are not limited to titanium alkoxides. such as tetramethyl, tetraethyl, tetra(n- propyl), tetraisopropyl and tetrabutyl titanates; dialkyl tin compounds, such as di-(n-butyl) tin dilaurate. di-(n-butyl) tin oxide and di-(n-butyl) tin diacetate; and oxides. acetate salts and sulfate salts of metals, such as magnesium, calcium, germanium, zinc, antimony, etc. Conveniently titanium alkoxides are employed. The catalyst level is employed in an effective amount to enable the copolymer formation and is not critical and is dependent on the catalyst that is used. Generally, the catalyst is used in concentration ranges of about 10 to about 500 ppm, preferably about less than about 200 ppm and most preferably about 20 to about 300 ppm.

In one embodiment of the present invention the polyarylates are prepared by melt processes that are well known to those skilled in the art and consist of several steps. The first reaction step is generally done under a nitrogen sweep with efficient stirring and the reactants may be heated slowly or quickly. Appropriate reaction conditions for a variety of acid-alcohol polymerizations are known in the art. Any polymerization temperature which gives a clear melt under the addition conditions and affords a reasonable rate of polymerization without unwanted amount of side reaction and degradation may be used. In one embodiment the temperature of the reaction is between about 175° C. and about 350° C. In another embodiment the temperature is between about 200° C. and about 300° C. The reaction is maintained in this stage for 0.5 to 3 hours with the condensation reaction of esterification taking place. In one embodiment the reaction is then carried out under vacuum of about 0.1 Torr while the reaction occurs and polyarylate of desired molecular weight is built. In one embodiment the polyarylate is recovered in the last step by either cooling and isolating the polymer and grinding or by extruding the hot polymer melt, cooling and pelletizing.

The reaction may be conducted optionally in presence of a solvent or in neat conditions without the solvent. The organic solvent used in the above process according to the invention should be capable of dissolving the polyarylate to an extent of at least 0.01 g/per ml at 25° C. and should have a boiling point in the range of 140-290° C. at atmospheric pressure. Preferred examples of the solvent include but are not limited to amide solvents, in particular, N-methyl-2-pyrrolidone, N-acetyl-2-pyrrolidone, N,N'-dimethyl formamide, N,N'-dimethyl acetamide, N, N'-diethyl acetamide, N,N'-dimethyl propionic acid amide, N,N'-diethyl propionic acid amide, tetramethyl urea, tetraethyl urea, hexamethylphosphor triamide, N-methyl caprolactam and the like. Other solvents may also be employed, for example, methylene chloride, chloroform, 1,2-dichloroethane, tetrahydrofuran, diethyl ether, dioxane, benzene, toluene, chlorobenzene, o-dichlorobenzene and the like.

In one embodiment the polyarylate composition may be made by conventional blending techniques. The production of the compositions may utilize any of the blending operations known for the blending of thermoplastics, for example blending in a kneading machine such as a Banbury mixer or an extruder. To prepare the composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device. In one embodiment the polyarylate synthesized by melt mixing process the pre mixing is carried out at a temperature range of between about 200° C. to about 375° C. The heating or melt mixing is typically carried out at a temperature range of about 250° C. to about 300° C.

In one embodiment of the present invention the composition could be prepared by solution method. The solution method involves dissolving all the ingredients in a common solvent (or) a mixture of solvents and either precipitation in a non-solvent or evaporating the solvent either at room temperature or a higher temperature of at least about 50° C. to about 80° C. In one embodiment, the reactants can be mixed with a relatively volatile solvent, preferably an organic solvent, which is substantially inert towards the polymer, and will not attack and adversely affect the polymer. Some suitable organic solvents include ethylene glycol diacetate, butoxyethanol, methoxypropanol, the lower alkanols, chloroform, acetone, methylene chloride, carbon tetrachloride, tetrahydrofuran and the like. In one embodiment of the present invention the non solvent is at least one selected from the group consisting of mono alcohols such as ethanol, methanol, isopropanol, butanols and lower alcohols with C1 to about C12 carbon atoms. In one embodiment the solvent is chloroform.

The preferred polyarylates are preferably high molecular weight polymers have an intrinsic viscosity (as measured in 60:40 solvent mixture of phenol/tetrachloroethane at 25° C.) of at least greater than about 0.25 deciliters per gram, specifically ranging from about 0.30 deciliters per gram to about 1.8 deciliters per gram. In another embodiment the intrinsic viscosity is in the range between about 0.30 deciliters per gram to about 1.2 deciliters per gram. In one embodiment of the present invention the polyarylates may be branched or unbranched and having a weight average molecular weight of at least greater than 15,000, preferably from about 20,000 to about 2,00,000 as measured by viscosity measurements in Phenol/tetrachloroethane (60:40, volume/volume ratio) solvent mixture. It is contemplated that the polyarylates may have various known end groups.

In one embodiment the glass transition temperatures ($T_g$) of the polyarylates are substantially high. The polyarylates of the present invention have a glass transition temperature in the range of between about 150° C. and about 450° C. and preferably between about 200° C. to about 350° C. The polyacrylate can have a yellowness index of less than about 2. A polyacrylate composition can transmit about greater than 90 percent light in the region of about 400 nm to about 800 nm.

The polyarylate of the present invention are soluble in low boiling chlorinated solvents like methylene chloride, ethylene chloride, chloroform, carbontetrachloride, tetrachloroethane and the like. In one embodiment the polyarylate of the present invention are chemical resistant to lower alcohols and ketones with C1 to about C12 carbon atoms like acetone. In yet another embodiment the polyarylate compositions are colourless.

The compositions can be molded into useful articles by a variety of means, for example injection molding, extrusion molding, rotation molding, foam molding, calendar molding, blow molding, thermoforming, compaction, melt spinning and the like, to form articles. Suitable articles are exemplified but are not limited to aircraft, automotive, truck, military vehicle (including automotive, aircraft, and water-borne vehicles), scooter, and motorcycle exterior and interior components, including panels, quarter panels, rocker panels, trim, fenders, doors, decklids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels and parts for outdoor vehicles and devices; enclosures for electrical and telecommunication devices, outdoor furniture, aircraft components; boats and marine equipment, including trim, enclosures and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters and like display items; wall panels, and doors; counter tops; protected graphics; outdoor and indoor signs; enclosures, housings, panels, and parts for automatic teller machines (ATM); computer; desk-top computer; portable computer; lap-top computer; palm-held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles and like applications. The invention further contemplates additional fabrication operations on said articles, such as, but not limited to, molding, in-mold decoration, baking in a paint oven, lamination and/or thermoforming.

In one embodiment of the present invention the polyarylate composition of the present invention, because of their advantageous thermal, mechanical and optical characteristics, especially preferred are articles for optical applications. The compositions in one embodiment can be employed as substrate for optical articles like the organic light emitting diode (OLED). The article of the present invention would include various electronic applications like for example flexible circuits, liquid crystal displays, organic light emitting diode (OLED) displays, and the like. The compositions also find application for headlight covers, markers for anti piracy, etc.

EXAMPLES

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. While only certain features of the invention have been illustrated and described herein, many modifications and changes will occur to those skilled in the art. Accordingly, these examples are not intended to limit the invention, as defined in the appended claims, in any manner.

In the following examples values for glass transition temperatures (Tg) were determined by differential scanning calorimetry (DSC) at a heating rate of 20° C. per minute. The intrinsic viscosity (IV) was measured in Ubbelhode suspended viscometer in phenol/tetrachloroethane 60/40 volume by volume ratio of the solvent mixture at 25° C. in thermostated viscosity bath and viscosity average molecular weight was determined. Also the Yellow index or YI was measured on a Gardner Colorimeter model XL-835. The percentage transmission was determined in accordance with test method ASTM D-1003. The various abbreviations used herein are tabulated in Table 1.

TABLE 1

| | |
|---|---|
| 1,3-BHPM | 1,3-Bishydroxyphenyl menthane |
| TCDBP | 4,4'-(Octahydro-4,7-methane-5H-inden-5-yliden)bisphenol |
| PPPBP | N-Phenyl-(3,3'-bis-(4-hydroxyphenyl)phthalimide |
| BPA | 4,4' Isopropylidene bisphenol |
| TPC | 1,4-benzenedicarbonyl chloride |
| IPC | 1,3-benzenedicarbonyl chloride |
| DMBPC | 1,1' Bis(4-hydroxy-3-methylphenyl)cyclohexane |
| TMBPC | 1,1'Bis(4-hydroxy-3,5-dimethyl phenyl)cyclohexane |
| TMBPTBC | 1,1 Bis(4-hydroxy-3,5-dimethyl phenyl)-4-tertiary bytyl cyclohexane |
| DCBP | 3,8-Dihydroxy-5a,10b-diphenyl coumarono[2,3-b]coumarane |
| BPAP | 4,4'-(1-phenylethylidene)bisphenol |
| TMBPF | 4,4'-Methylene bisphenol |
| BPF | 4,4'-(9-Flouorenylidene)diphenol |
| SBI | 3,3,3'3'-Tetramethyl-1,1'-Spirobiindane-6,6'-diol |
| EDO | 1,4-Butane diol |
| FC | Fumaryl Chloride |
| EG | 1,2-Ethane diol |
| TMBPA | 4,4'-Isopropylidenebis(2,6-dimethylphenol) |

Preparation of Polyarlates

A 4-neck 1000 mL round bottom flask was fitted with cooling condenser, stirrer blade, 50 ml addition funnel and a 250 ml addition funnel. Anhydrous potassium carbonate (1.275 grams; 9.24 mmol) and 75 ml dichloromethane were added into the flask. 1,4-Butane Diol (0.5543 grams; 6.2 mmol) was weighed in a vial and fed into the reactor with 75 mL dichloromethane. Fumaryl chloride (0.4704 grams; 3.1 mmol) was weighed in a vial and added in 25 mL of dichloromethane through the addition funnel. The solution was added dropwise over a period of 15-20 minutes. The addition funnel was washed with 15 mL dichloromethane couple of times and reaction mixture was stirred for an additional 30 minutes. Benzyl triethyl ammonium chloride (0.1822 gram) and 4,4'-(Octahydro-4,7-methane-5H-inden-5-yliden) bisphenol (18.719 grams; 58.5 mmol) were added to the solution, followed by addition of a solution of sodium hydroxide (NaOH; 9.348 grams; 233.7 mmol) in 150 mL DM water under stirring conditions. The stirring was allowed to proceed for 15 minutes, after which freshly crystallized (in hexane) isophthaloyl chloride (12.490 grams; 62 mmol) of was weighed and transferred into 250 mL addition funnel in 60 mL dichloromethane. The addition was carried out dropwise over a period of 30-40 minutes. After completion of addition, stirring was continued for about 60 minutes at room temperature. A solution 0.0264 gram benzoyl chloride in dichloro methane (10 mL) was added and stirred for 45 minutes. Stirring was stopped and the reaction mixture was transferred to a separator funnel, the organic layer was allowed to settle to bottom while the aqueous layer was drained off. Organic layer was repeatedly washed with 250 mL 1.0 M hydrochloric acid solution. The organic layer was washed with water (250 mL), and slowly added into cold solution of 1000 mL methanol with stirring. The polymer thus formed was filtered under suction and washed with methanol and dried overnight in an oven at 80° C. The procedure was repeated for preparation of polyarylates using the various monomer and the data is reported in Table 2.

TABLE 2

| | | Tg (° C.) | | | Intrensic Viscosity (IV) (dL/g) | | | | | |
|---|---|---|---|---|---|---|---|---|---|---|
| | | | | | without Unsaturation | | 5% unsaturation FC-BDO | | 10% unsaturation FC-BDO | |
| | Polyarylate | Without Unsaturation | 5% unsaturation FC-BDO | 10% unsaturation FC-BDO | Intrinsic Viscosity (IV) (dL/g) | Mol. Wt (IV) | Intrinsic Viscosity (IV) (dL/g) | Mol. Wt (IV) | Intrinsic Viscosity (IV) (dL/g) | Mol. Wt (IV) |
| 1. | TCDBP/IPC | 265 | 261 | — | 0.32 | 24100 | 0.58 | 4900 | — | — |
| 2. | TCDBP/TPC | 274 | 285 | 301 | 0.76 | 67600 | 0.76 | 67700 | 0.89 | 81700 |
| 3. | PPPBP/TPC | 325 | 319 | — | 1.42 | 142700 | 0.59 | 50000 | — | — |
| 4. | PPPBP/IPC | 299 | 258 | — | 1.16 | 112100 | 0.59 | 50000 | — | — |
| 5. | BPAP/TPC | 281 | 238 | — | 1.45 | 146300 | 0.93 | 86100 | — | — |
| 6. | TMBPC/TPC | 278 | 272 | 265 | 1.12 | 107500 | 0.85 | 77300 | 0.81 | 73000 |
| 7. | TMBPTBC/TPC | 282 | 282 | — | 1.09 | 104100 | 0.65 | 56100 | — | — |
| | | | 5% FC-EG | 10% FC-EG | | | 5% FC-EG | | 10% FC-EG | |
| 8. | TCDBP/TPC | 274 | 312 | — | 0.76 | 67600 | 1.09 | 104100 | — | — |
| 9. | PPPBP/IPC | 299 | 295 | 278 | 1.16 | 112112 | 0.75 | 66600 | 0.6 | 51000 |

In a 100 mL round bottomed two neck flask equipped with a magnetic stirrer, nitrogen gas inlet, CaCl$_2$ guard tube was charged with 4,4'-(Octahydro-4,7-methane-5H-inden-5-yliden) bisphenol (1 gm; 3.12 mmol), (15 mL) methylene dichloride, and 0.78 gm (7.8 mmol) triethyl amine. The resulting reaction mixture was stirred at room temperature. The bisphenol dissolved in methylene chloride and a clear solution was obtained. The reaction flask placed in an ice salt mixture and cooled to about 0° C. To this solution, 0.633 gm (3.12 mmol) terephthaloyl dichloride dissolved in methylene chloride was added dropwise over a period of 10 minutes. An additional amount of (5 mL) methylene chloride was added to wash the terephthaloyl chloride in to the reaction mixture. The reaction mixture was stirred at 0° C. for 30 minutes. The reaction mixture was brought to room temperature and stirred for about another 2.5 hours. The reaction mixture was diluted with methylene chloride and washed repeatedly with distilled water. The solution was poured slowly into methanol with stirring to precipitate the white fibrous polymer. It was filtered under suction, washed with water and dried in oven at 80° C. for 12 h. The viscosity of the polymer is 0.38 dL/g. and the Tg of the polymer is 288° C. The polyarylates given in Table 3 were synthesized using this method and are reported in Table 3.

TABLE 3

| | Polymer | Monomers | | IV (dL/g) | MW (IV) | Tg (° C.) |
|---|---|---|---|---|---|---|
| | | Bisphenol | Acid Chloride | | | |
| 10. | 1,3BHPM-PA | 1,3BHPM | TPC | 0.82 | 54,300 | 285 |
| 11. | 1,3HPM-PA | 1,3BHPM | IPC | 0.69 | 73,600 | 251 |
| 12. | 1,3BHPM-PA | 1,3BHPM | TPC/IPC (50/50) | 0.65 | 61,200 | 273 |
| 13. | TCDBP-PA | TCDBP | TPC | 0.38 | 41,400 | 288 |
| 14. | TCDBP-PA | TCDBP | IPC | 0.32 | 30,100 | 267 |
| 15. | PPPBP-PA | PPPBP | TPC | 0.33 | 20,100 | 289 |
| 16. | PPPBP-PA | PPPBP | IPC | 0.24 | 22,200 | 267 |

Preparation of Polyarylate by Interfacial Method:

In a two neck round bottom flask, 200 milligram of NaOH (5 mmol) was dissolved in 12 ml of deionised water at room temperature. To this 1 gm (2.5 mmol) of 3,8-dihydroxy-5a,10-diphenyl coumarono[2,3-b]coumarane (DCBP) was added and with gradual stirring till it dissolved completely in NaOH. The clear solution was obtained and 5 mg of benzyl-triethylammonium chloride was added and reaction flask was placed in an ice salt mixture and stirred. The 0.513 gm (2.5 mmol) of terephthaloyl chloride dissolved in 10 ml of dry chloroform was added dropwise through addition funnel in 10 min. After the addition was complete the reaction mixture was rapidly stirred (1500 rpm) for 45 min followed by dilution with chloroform. The reaction mixture was then washed with dilute HCl solution repeatedly with distilled water in a separatory funnel till the pH of the solution turned neutral. The organic layer was poured slowly into methanol, and the white fibrous polymer was separated. It was filtered under suction, washed with water and dried in oven at 80° C. for 12 h. The viscosity of the polymer in PhOH/TCE solvent mixture is 0.54 dL/g. and the Tg of the polymer is 343° C. Polyarylates compositions in Table 4 have been synthesized using this procedure.

TABLE 4

| | Polyarylate | Composition | Film Thickness (micron)[a] | Tg (° C.)[b] | MW (by IV) | IV[c] | YI |
|---|---|---|---|---|---|---|---|
| 17. | DMBPC/TPC | 100/100 | 125-140 | 233 | 165000 | 1.61 | 1.7 |
| 18. | TMBPC/TPC | 100/100 | 125-140 | 279 | 108000 | 1.12 | 0.9 |
| 19. | TMBPTBC/TPC | 100/100 | 130-140 | 211 | 60000 | 1.09 | 1.1 |
| 20. | TMBPA/TPC | 100/100 | 85-110 | 212 | 32700 | 0.41 | 0.6 |
| 21. | DCBP/TPC | 100/100 | 20-35 | 343 | 45300 | 0.54 | 1 |
| 22. | BPAP/TPC | 100/100 | 120-150 | 282 | 147000 | 1.45 | 2 |

TABLE 4-continued

| Polyarylate | Composition | Film Thickness (micron)[a] | Tg (° C.)[b] | MW (by IV) | IV[c] | YI |
|---|---|---|---|---|---|---|
| 23. PPPBP/TPC | 100/100 | 120-150 | 325 | 143000 | 1.42 | 1.6 |
| 24. PPPBP/IPC | 100/100 | 120-150 | 300 | 112000 | 1.16 | 1.2 |
| 25. TCDBP/TPC | 100/100 | 120-150 | 285 | 68510 | 0.76 | 1.1 |
| 26. TCDBP/IPC | 100/100 | 130-140 | 265 | 23900 | 0.32 | 1.5 |
| 27. BPAP/IPC | 100/100 | 125-150 | 223 | 93700 | 1 | 0.9 |
| 28. BPAP/TMBPF/TPC | 30/70/100 | 120-130 | 255 | 104400 | 1.09 | 1.1 |
| 29. BPF/TMBPF/TPC | 30/70/100 | 125-140 | 280 | 151900 | 1.5 | 2 |
| 30. BPF/BPA/TPC | 70/30/100 | 125-145 | 310 | 89500 | 0.96 | 1.2 |
| 31. BPAP/BPF/TPC | 30/70/100 | 130-140 | 300 | 32000 | 0.41 | 1.8 |
| 32. SBI/TMBPF/TPC | 70/30/100 | 85-110 | 286 | 46500 | 0.56 | 1 |
| 33. BPAP/TMBPF/IPC | 30/70/100 | 20-35 | 217 | 142000 | 1.42 | 1.8 |

[a]casted film in dichloromethane & solvent evaporated at room temp.
[b]from DSC at 10° C./min.
[c]In phenol/TCE at 3:2 V/V at 25° C.

The invention claimed is:

1. An article comprising a polyester composition, wherein the polyester composition comprises a polyester polymer that consists of structural units derived from 1,4-benzenedicarboxylic acid, 1,3-benzenedicarboxylic acid, or a combination thereof, and 1,1-bis(4-hydroxy-3,5-dimethylphenyl)-4-tertiary-butyl-cyclohexane;

wherein the polyester polymer has an intrinsic viscosity measured in a 60/40 volume by volume ratio of phenol/tetrachloroethane at 25° C. of at least greater than about 0.25 dL/g and a glass transition temperature of between about 150° C. and about 450° C.;

wherein the polyester polymer transmits greater than 90 percent light in the region of about 400 nm to about 800 nm and has a yellowness index of less than about 2; and wherein the polyester composition further comprises an additive selected from the group consisting of anti-oxidants, flame retardants, reinforcing materials, colorants, mold release agents, fillers, nucleating agents, UV light stabilizers, heat stabilizers, lubricants, antioxidants, flame retardants, pigments, and combinations thereof.

2. The article of claim 1 wherein the polyester composition comprises 1 to 20 percent by weight, based on the weight of the polyester polymer, of a flame-retardant to obtain a UL94 V-0 rating.

3. The article of claim 1, wherein the article is a substrate for optical applications.

* * * * *